July 7, 1953

R. DÉTREZ

2,644,309

SYSTEM FOR CONTROLLING THE MOVEMENTS
OF HYDRAULICALLY OPERATED PISTONS

Filed Sept. 10, 1951

INVENTOR.

René Détrez

BY

Attorneys.

INVENTOR.
René Détrez
BY
Attorneys.

July 7, 1953　　　　　R. DÉTREZ　　　　　2,644,309
SYSTEM FOR CONTROLLING THE MOVEMENTS
OF HYDRAULICALLY OPERATED PISTONS
Filed Sept. 10, 1951　　　　　　　　　　4 Sheets-Sheet 4

Fig. 10.

INVENTOR.
René Détrez
BY
Attorneys.

Patented July 7, 1953

2,644,309

UNITED STATES PATENT OFFICE 2,644,309

SYSTEM FOR CONTROLLING THE MOVEMENTS OF HYDRAULICALLY OPERATED PISTONS

René Détrez, Nogent-sur-Marne, France

Application September 10, 1951, Serial No. 245,943
In France April 21, 1944

Section 1, Public Law 690, August 8, 1946
Patent expires April 21, 1964

16 Claims. (Cl. 60—97)

This invention relates to a system for controlling the movements of hydraulically operated pistons. The present application is a continuation-in-part of my prior application, Serial No. 613,664, filed August 30, 1945, now abandoned, entitled "Method for Distributing Fluid Under Pressure in Machines and Apparatuses with Hydraulic Movements."

In certain machines such as machine tools, machines for making cardboard articles, printing machines, mechanical stokers, machines for packing, bottling or the like, it is well known to use pistons reciprocating in cylinders and actuated by a fluid under pressure, such as oil for instance, for controlling the predetermined movements of such machines.

The movements of said pistons, hereinafter called "driving pistons," are controlled by means of distributors which may be either slide valves, poppet valves operated by known types of valve gear, or rotary valves of the barrel, cone, or disc type. These distributors control the movements of the driving pistons and are usually actuated by mechanisms independent of the driving pistons, such as cams and their associated followers.

The above described method for the effecting of the distribution of liquid to the cylinders with the pistons therein has many disadvantages, among which is that the system for carrying it out is somewhat complicated and expensive.

Thus, in the case where a machine must perform seriatim a plurality of movements, each movement being carried out by a separate driving piston, it can happen that, when the movements of said pistons are controlled by cams, one of said movements will not be completed for performing the operation to be carried out by the respective driving piston, when the following movement is to start. This can be caused, for instance, by a change in the degree of the viscosity of the oil which actuates the driving pistons.

In the above case, such an incident in the sequence of movements can result in the operating parts of the machine interfering with one another or with the articles being processed by the machine.

The stated interference of the parts of the machine could occur, for instance, in a multiple spindle drilling and boring machine in which holes to communicate with each other are simultaneously being bored, if a delay should occur in the boring of one hole and if a drill boring the second hole should strike against the first drill before the latter has completed its work and been released.

In other cases, the same incomplete operation of some members can result in the operating parts of the machine not having sufficient time to complete their working steps. This can happen, for instance, in certain lathes with hydraulically operated working parts, when the tool holder carriage is returned to the rest position before the cutting stroke has been completed.

The present mode of controlling the driving pistons which actuate the operating parts of the machines, according to the objects of the instant invention, has been devised for overcoming the above mentioned disadvantages. The driving pistons are controlled one from another seriatim and each piston is controlled by another piston, and can receive its fluid under pressure only when the controlling piston has completed its travel corresponding to the work or to the step which it is to perform.

Thus, if a first driving piston must complete a stroke of a foot, for instance, before releasing a second driving piston for actuation, this latter piston can begin its stroke only when the first driving piston has reached the end of its stroke of a foot corresponding to the work to be done by the said first driving piston.

Likewise, if a second driving piston must complete a stroke of six (6) inches, for instance, before releasing a third driving piston for actuation, the latter will not be able to start on its stroke before the second driving piston has reached the predetermined stroke of six (6) inches.

It is therefore easy to conceive that a system designed according to the above outlined principle makes it possible to avoid with certainty that a working step will not be performed, or will be incompletely performed, and of course the consequence of the non-performance, or incomplete performance of said working step.

The object of the present invention is to provide a hydraulic system in which the sequence of operation of the driving pistons is assured, for so long as one driving piston has not completed its stroke and arrived at the end thereof, wherein the following driving piston is released for operation, the establishment of communication of the following driving piston with the fluid supply line cannot be made and, accordingly, the following driving piston cannot begin its stroke.

Another object of the present invention is to provide a hydraulic system in which one and the same machine there is imparted to the driving pistons a complete cycle of movements which movements are repeated automatically and in a continuous manner without the necessary interference of any other control members than their own distributors or without any other sources of power than that of the fluid under pressure which is supplied to the driving pistons.

A further object of the present invention is to provide a hydraulic system in which the times for completing the strokes of the driving pistons can be regulated instantaneously and simultaneously by means of a single valve positioned in the main fluid pressure supply line and in which the time of operation of any single driving piston can be regulated separately by means of an individual valve positioned in the branch supply line.

An additional object of the present invention is to provide a hydraulic system in which when a plurality of driving pistons is used, these can be juxtaposed, each one being mounted, respectively, in any plane to form a driving unit.

A still further object of the present invention is to provide a hydraulic system in which the driving pistons will make complete working strokes, notwithstanding variations in the viscosity of the oil, or any incident or accident blocking one of the driving pistons during its working stroke, this being accomplished by making the driving pistons sequentially operable and each released by the preceding driving piston.

By way of example the hydraulic system according to the present invention is shown as schematically applied to the loading and unloading unit of a bottle washing machine. In this example two (2) successive opposite movements of each driving piston must be effected and on each stroke each driving piston must necessarily complete a predetermined operation before the next piston begins its movement.

Referring now to the drawings in detail, wherein a preferred embodiment of the hydraulic system according to the present invention is shown:

Figure 3A is a cross-sectional view on the section line A—A of Fig. 2 through the piston rod of the first driving piston and associated cylinder head showing one valve arrangement;

Figures 1, 3B, 3C, 3D, 3E:
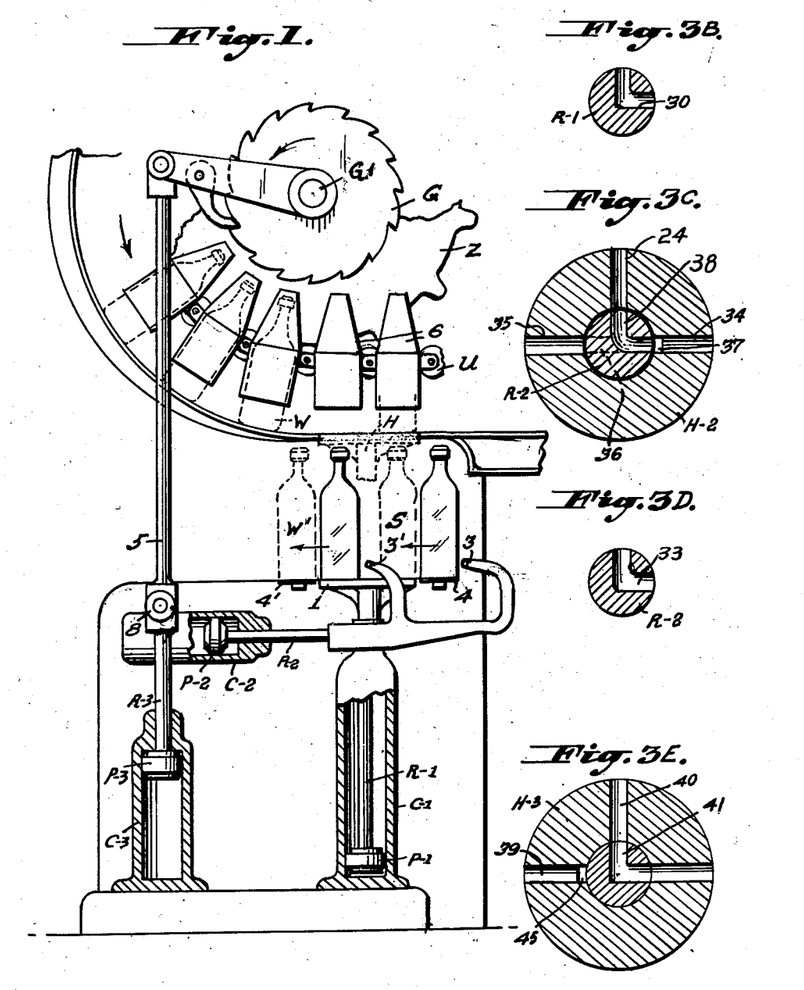
Figure 1 is a side elevation view showing diagrammatically the hydraulic system according to the present invention applied to a bottle handling machine, the cylinders in which the driving pistons reciprocate being shown in section.
Figure 3B is a cross-sectional view on the section line B—B of Fig. 2 through the piston rod of the first driving piston showing a second valve arrangement.
Figure 3C is a cross-sectional view on the section line C—C of Fig. 2 through the piston rod of the second driving piston and associated cylinder head showing the valve arrangement for this piston corresponding to that in Figure 3A.
Figure 3D is a cross-sectional view on the section line D—D of Fig. 2 through the piston rod of the second driving piston showing a second valve arrangement corresponding to that in Figure 3B.
Figure 3E is a cross-sectional view on the section line E—E of Fig. 2 through the piston rod of the third driving piston and associated cylinder head showing the valve arrangement for this piston corresponding to those in Figures 3A and 3C.

Referring now to the drawings in detail, and to Fig. 1 in particular, the hydraulic system according to the present invention is shown applied to an automatic loader and unloader for bottles. Such a loader is applied, for instance, to a bottle washing machine wherein it is necescary to move bottles or containers arriving at the machine. In the example shown the supporting platform 1 must move upwardly and then back downwardly to the initial position, these movements being carried out by a piston P-1 reciprocating in a cylinder C-1.

A horizontal conveyor 4 carries one row of dirty bottles, transversely with respect to the loader, in front of a push bar 3. This push bar 3 is formed on the rod R-2 of the piston P-2 which reciprocates in a horizontally mounted cylinder C-2. Said push bar moves at right angles with respect to conveyor 4 and removes the row of dirty bottles from the conveyor onto the supporting platform 1, to occupy the position S shown in dotted lines. At that time the platform 1 moves upwardly to the position H shown in dotted lines and stops for a moment.

A ratchet gear G is actuated by a rod 5, connected by a pivotal joint 8 to the piston rod R-3 of a piston P-3 which reciprocates in a cylinder C-3. When the platform 1 stops, this ratchet gear is operated upon the reciprocation of the rod 5 and revolves through an angle corresponding to one notch. A sprocket wheel Z, keyed to the axle G-1 of ratchet gear G, drives a chain U to which the bottle carriers 6 are secured. One row of washed bottles W is thus placed on platform 1. During the following step, said platform, loaded with the row of washed bottles, is moved downwardly to occupy its first position. Then this row of washed bottles is moved by a push bar 3', formed on the rod R-2, to occupy a position W'. At the same time another rank of dirty bottles, carried by the conveyor 4, is pushed by the push bar 3 onto the platform 1 and the cycle of operation is complete.

It will of course be understood that the exact number of pistons utilized will be determined by the type of machine to which the hydraulic system is applied. It is also the case that the pistons C-1, C2, and C3 could operate the working parts of different machines, which are required to be synchronized, instead of sequentially operated parts of the same machine. Also, while in the example given the piston P-1 has a stroke of approximately a foot and the piston P-2 a stroke of approximately six (6) inches, it will be understood that these are arbitrarily selected values and the lengths of the strokes of these pistons, as well as that of the piston P-3, will be determined according to the operations to be performed.

Figures 2, 5A:
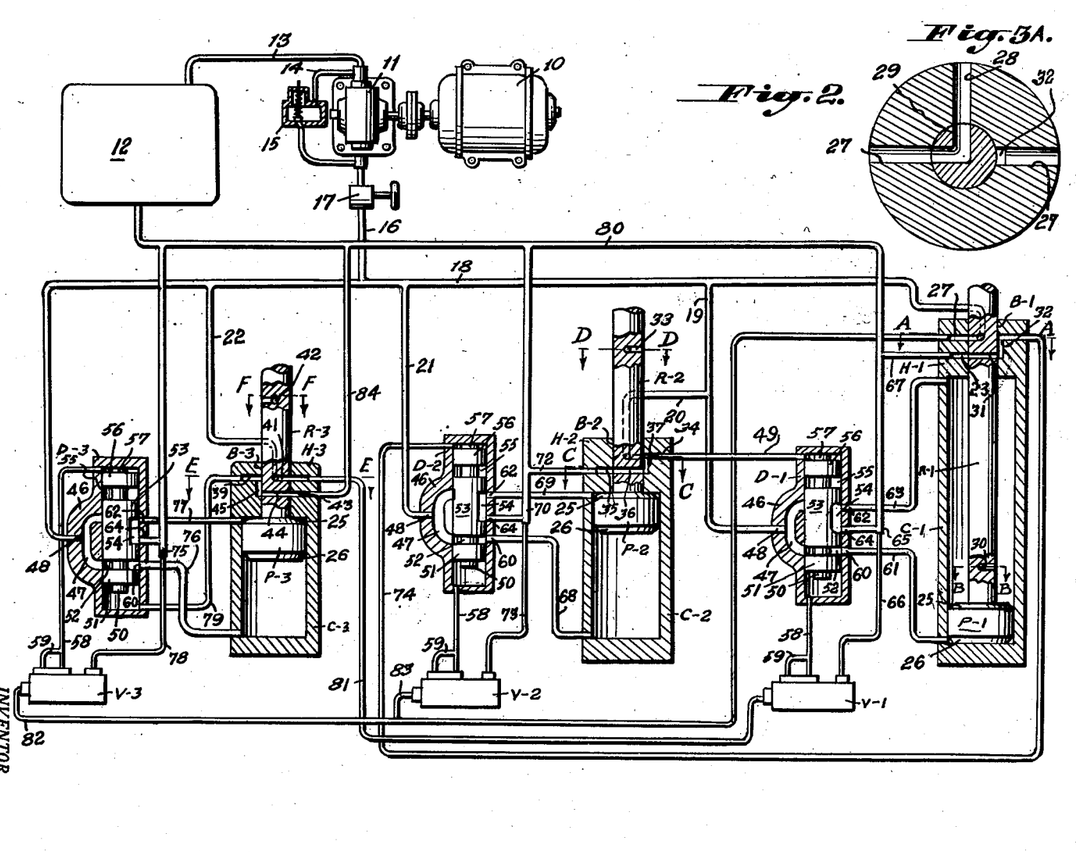
Figure 2 is a lay out view of the hydraulic system according to the present invention, the driving pistons and cylinders in which same reciprocate, and the fluid distributors being shown in section.

In the layout view of Figure 2 the three (3) pistons and cylinder combinations C-1, P-1, C-2, P-2, and C-3, P-3, the associated distributors D-1, D-2, and D-3, and the directional valves V-1, V-2, and V-3, respectively, are shown. A motor 10 drives a pump 11 which draws fluid, preferably oil, from a reservoir 12, which latter is preferably at atmospheric pressure, through a conduit 13 and discharges same through a main line conduit 16. The main line conduit 16 has a control valve 17 therein by means of which the times for the completion of the working strokes of the pistons P-1, P-2 and P-3 can be simultaneously varied. Between the conduit 13 from the reservoir and the conduit 16 from the pump there is a by-pass conduit 14 with a spring-biased check valve 15 therein. The check valve 15 will permit the pump 11 to continue in operation without damage even though the valve 17 should be fully closed before the motor 10 is stopped. It will also prevent the pump 11 and motor 10 from being damaged due to overload if one of the pistons C-1, C-2, or C-3 should become jammed.

The main line conduit 16 connects with a header 18 which extends at its opposite ends directly to the cylinder C-1 and the distributor D-3, respectively. From this header 18 branch conduits 19, 21, and 22 extend to the distributor D-1, the distributor D-2, and the cylinder C-3, respectively. A branch conduit 20 from the conduit 19 extends to the cylinder C-2. As stated, the branch conduit 20 to the cylinder C-2 is shown tapped off the branch conduit 19 to the distributor D-1 but this is merely an expedient adopted in view of the spacing of the component parts of the hydraulic system; the branch conduit 20 could as well be tapped directly off the header 18.

The pistons P-1, P-2, P-3 reciprocate within the cylinders C-1, C-2, and C-3, respectively, the rods R-1, R-2, and R-3, respectively, passing through bores B-1, B-2, and B-3 in cylinder heads H-1, H-2, and H-3, respectively. Each piston has an upper section 25 of reduced diameter and a similar lower reduced section 26. These reduced sections abut the inner faces of the upper and lower cylinder heads at the ends of the strokes of the pistons to prevent vacuum lock on the pistons.

The cylinder head H-1 has an outer diametrical bore 27 (Fig. 3A) therethrough, which of course traverses the piston rod bore B-1. At right angles to this diametrical bore and coplanar therewith, there is formed a radial bore 28, which also connects with the piston rod bore B-1. The fluid pressure supply header 18 is connected in the outer end of the radial bore 28. The piston rod R-1 has a first right angle bore 29 therein which, when the piston P-1 is at the end of its inward stroke and abutting the inner face of the lower cylinder head, registers with the left half of the bore 27 and the radial bore 28 (Fig. 3A). The piston rod R-1 also has a second right angle bore 30 (Fig. 3B) therein which, when the piston P-1 is at the end of its outward stroke and abutting the inner face of the upper cylinder head H-1, registers with the radial bore 28 and the right half of the diametrical bore 27, placing same in communication. Parallel to the diametrical bore 27 and spaced inwardly therefrom, there is a second radial bore 23. The piston rod R-1 has a diametrical bore 31 therein which registers with the radial bore 23, also when the piston P-1 is at the end of its inward stroke and abutting the inner face of the lower cylinder head. Along the bore B-1 in the cylinder head H-1, there is formed a lengthwise extending passage 32 between the right half of the diametrical bore 27 and the plane of the radial bore 23, the diametrical bore 31 through the piston rod R-1 also communicating with this passage, when the piston P-1 is at the end of its inner stroke and abutting the inner face of the lower cylinder head.

The cylinder head H-2 has co-planar outer radial bores 24 and 24 (Fig. 3C) therein, which connect with the piston rod bore B-2. The fluid pressure supply branch conduit 20 is connected in the outer end of the radial bore 24. A right angle bore 33 is formed in the piston rod R-2 (Fig. 3D) which, when the piston P-2 is at the end of its inward stroke and abutting the inner face of the lower cylinder head, registers with the radial bores 24 and 34 and places same in communication. Parallel to the radial bores 24 and 34 and spaced inwardly therefrom, there is a second radial bore 35. The piston rod R-2 has a diametrical bore 36 therein which registers with the radial bore 35, when the piston P-2 is at the end of its outward stroke and abutting the inner face of the upper cylinder head. Along the bore B-2 in the cylinder head H-2, there is formed a lengthwise extending passage 37 from the plane of the radial bore 35 to the radial bore 34, the diametrical bore 36 through the piston rod R-2 also communicating with this passage when the piston P-2 is at the end of its outer stroke and abutting the inner face of the cylinder head H-2. The piston rod R-2 also has a second right angle bore 38 (Fig. 3D) therein which, when the piston P-2 is at the end of its inward stroke and abutting the inner face of the upper cylinder head, also registers with the radial bores 24 and 34 and places same in communication.

Figure 3F:
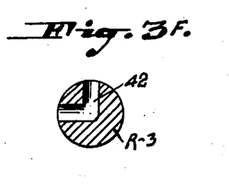
Figure 3F is a cross-sectional view on the section line F—F of Fig. 2 through the piston rod of the third driving piston showing a third valve arrangement corresponding to those in Figures 3B and 3D.

The cylinder head H-3 has an outer diametrical bore 39 (Fig. 3E) therethrough, which of course traverses the piston bore B-3. At angles to this diametrical bore and co-planar therewith, there is formed a radial bore 40 which also connects with the piston rod bore B-3. The piston rod R-3 has a first right angle bore 41 therein, which when the piston P-3 is at the end of its outward stroke and abutting the inner face of the upper cylinder head H-3, registers with the radial bore 40 and the right half of the diametrical bore 39. The fluid pressure supply branch conduit 22 is connected to the outer end of the radial bore 40. The piston rod R-3 also has a second right angle bore 42 (Fig. 3F) therein which, when the piston P-3 is at the end of its inward stroke and abutting the inner face of the lower cylinder head, registers with the radial bore 40 and the left half of the diametrical bore 39, placing same in communication. Parallel to the diametrical bore 39 and spaced inwardly therefrom, there is a second radial bore 43. The piston rod R-3 has a diametrical bore 44 therein which registers with the radial bore 43, also when the piston P-3 is at the end of its outer stroke and abutting the inner face of the upper cylinder head H-3. Along the bore B-3 in the cylinder head H-3 there is formed a lengthwise extending passage 45 between the left half of the diametrical bore 39 and the plane of the radial bore 43, the diametrical bore 44 through the piston rod R-3 also communicating with this passage when the piston P-3 is at the end of its outer stroke and abutting the inner face of the upper cylinder head H-3.

The fluid pressure distributors for the cylinders C-1, C-2, and C-3 are identical in construction and are designated generally by the reference numerals D-1, D-2, and D-3, respectively, applied to the cylinders of the distributors. On one side of the cylinder of the distributor D-1 there is formed a fluid admission chest 46 having a U-shaped passage 47 therein. The branch fluid pressure supply conduit 20 communicates with the passage 47 through a port 48 in the fluid admission chest. Within the cylinder D-1 a control piston is adapted to reciprocate. This control piston is composed of a central section 53 and end sections 51 and 56, the latter being separated from the control section 53 by reduced neck sections forming fluid pressure passages 52 and 55, respectively, past the piston. The end section 51 has an integral central stop 50 thereon and likewise the end section 56 has an integral central stop 57 thereon for preventing vacuum lock of the control piston within the cylinder D-1 at both ends of the upward and downward strokes. The central section 53 of the control piston has cut-away section in one side forming a lengthwise extending passage 54.

The control piston is moved on its upward stroke by fluid under pressure admitted to the lower end of the cylinder D-1 through a conduit 58, which extends from a directional valve V-1, to be later described. On the downward stroke this conduit 58 provides for the exhaust of the fluid from the lower end of the cylinder D-1. Conversely, the control piston is moved on the downward stroke by fluid under pressure admitted to the upper end of cylinder D-1 through a conduit 49 which extends from the cylinder C-2, being connected in the radial bore 34 of the latter. On the upward stroke this conduit provides for the exhaust of the fluid from the upper end of the cylinder D-1.

A port 60 in the cylinder D-1 is diametrically aligned with the lower end of the U-shaped passage 47 in the fluid admission chest 46 and is connected by a conduit 61 to the lower end of the cylinder C-1. Similarly a port 62 in the cylinder is diametrically aligned with the upper end of the U-shaped passage 47 in the fluid admission chest 46 and is connected by a conduit 63 to the upper end of the cylinder C-1. A port 64 at approximately the mid-section of the cylinder D-1 receives the end of a branch exhaust conduit 65.

It will be seen that when the control piston is in the upper position, as shown in Figure 2, fluid under pressure will pass from the branch fluid pressure conduit 19, through the port 48 and lower branch of the U-shaped passage 47 in the fluid admission chest 46, the passage 52 in the control piston, the port 60 and the conduit 61 to the lower end of the cylinder C-1. At the same time the lengthwise extending passage 54 in the control piston connects the ports 62 and 64. The exhaust fluid from the upper end of the cylinder C-1 then passes through the conduit 63, port 62, passage 54 in the control piston 53, port 64 and into the branch exhaust conduit 65. Conversely, when the control piston is at the end of its down stroke, the stop 50 thereon then abutting the lower end of the cylinder, fluid under pressure will pass from the branch fluid pressure conduit 19 through the port 48 and upper branch of the U-shaped passage 47 in the fluid admission chest 46, the passage 55 in the control piston, the port 62 and the conduit 63 to the upper end of the cylinder C-1. Similarly, at the same time, the lengthwise extending passage 54 in the control piston connects the ports 60 and 64, that is the conduit 61 to the branch exhaust conduit 65, so as to provide for exhaust of fluid from the lower end of the cylinder C-1.

In the fluid pressure distributor D-2, the branch fluid pressure supply conduit 21 communicates with the U-shaped passage 47 in the fluid admission chest 46 through the port 48, the port 60 is connected by a conduit 68 to the lower end of the cylinder C-2, and the port 62 by a conduit 69 to the upper end of the cylinder C-2.

The control piston of the distributor D-2 is moved on its upward stroke by fluid under pressure admitted to the lower end of the cylinder of the distributor through a conduit 58, which extends from a directional valve V-2, to be later described. On the downward stroke of the control piston, this conduit 58 provides for the exhaust of the fluid from the lower end of the cylinder D-2. Conversely, the control piston 53 of this distributor is moved on the downward stroke by fluid under pressure admitted to the upper end of the cylinder D-2 by a conduit 74 which extends from the cylinder C-1, being connected in the right half of the diametrical bore 27 of the latter. On the upward stroke of the control piston this conduit 74 provides for the exhaust of the fluid from the upper end of the cylinder D-2.

When the control piston of the distributor D-2 is in the upper position, as shown in Figure 2, fluid under pressure will pass from the branch fluid pressure conduit 21 through the port 48 and lower branch of the U-shaped passage 47 in the fluid admission chest 46, the passage 52 in the control piston, the port 60 and the conduit 68 to the lower end of the cylinder C-2. At the same time the lengthwise extending passage 54 in the control piston connects the ports 62 and 64, that is the conduit 69 to the branch exhaust conduit 70, so as to provide for the exhaust of fluid from the upper end of the cylinder C-2. Conversely, when the control piston of the distributor D-2 is at the end of its downward stroke, the stop 50 thereon then abutting the lower end of the cylinder, fluid under pressure will pass from the branch fluid pressure conduit 21 through the port 48 and upper branch of the U-shaped passage 47 in the fluid admission chest 46, the passage 55 in the control piston, the port 62 and the conduit 69 to the upper end of the cylinder C-2. Similarly, at the same time, the lengthwise extending passage 54 in the control piston connects the ports 60 and 64, that is the conduit 68 to the branch exhaust conduit 70, so as to provide for the exhaust of fluid from the lower end of the cylinder C-2.

In the fluid pressure distributor D-3, the left end of the header 18 communicates with the U-shaped passage 47 in the fluid admission chest 46 through the port 48, the port 60 is connected by a conduit 76 to the lower end of the cylinder C-3, and the port 62 by a conduit 77 to the upper end of the cylinder C-3.

The control piston 53 of the distributor D-3 is moved on its upward stroke by fluid under pressure admitted to the lower end of the cylinder of the distributor through a conduit 79 which extends from the cylinder C-3, being connected in the left half of the diametrical bore 39 to the latter. On the downward stroke of the control piston this conduit 79 provides for the exhaust of the fluid from the lower end of the cylinder D-3. Conversely, the control piston of this distributor is moved on the downward stroke by fluid under pressure admitted to the upper end of the cylinder D-3 through a conduit 58, which extends from a directional valve V-3, to be later described. On the upward stroke of the control piston this conduit 58 provides for the exhaust of the fluid from the upper end of the cylinder D-3.

When the control piston 53 of the distributor D-3 is in the upper position, as shown in Figure 2, fluid under pressure will pass from the left end of the header 18 through the port 48 and lower branch 47 in the fluid admission chest 46, the passage 52 in the control piston, the port 60 and the conduit 76 to the lower end of the cylinder C-3. At the same time, the lengthwise extending passage 54 in the control piston connects the ports 62 and 64, that is the conduit 77 to the branch exhaust conduit 75, so as to provide for the exhaust of fluid from the upper end of the cylinder C-3. Conversely, when the control piston of the distributor D-3 is at the end of its downward stroke, the stop 50 thereon then abutting the lower end of the cylinder, fluid under pressure will pass from the left end of the header 18 through the port 48 and upper branch of the U-shaped passage 47 in the fluid admission chest 46, the passage 55 in the control piston, the port 62 and the conduit 77 to the upper end of the cylinder C-3. Similarly, at the same time, the lengthwise extending passage 54 in the control piston connects the ports 60 and 64, that is the conduit 76 to the branch exhaust conduit 75, so as to provide for the exhaust of fluid from the lower end of the cylinder C-3.

It will be understood that the distributors D-1, D-2, and D-3 could be mounted directly on the cylinders C-1, C-2, and C-3, respectively, if desired, whereby the number of conduits could be reduced and the lengths of the remaining conduits could be shortened. Also, the control pistons 53 of the distributors could be actuated by a different fluid at a higher or lower pressure, if desired, from the fluid which actuates the main pistons P-1, P-2, and P-3. In order to accomplish this a double compartment pump or two separate pumps would be used.

The exhaust conduit system comprises the conduits 61 and 63, between the distributor D-1 and the cylinder C-1, the conduit 49 from the distributor D-1 to the cylinder C-2, the conduits 68 and 69 between the distributor D-2 and the cylinder C-2, the conduit 72 from the cylinder C-2 to the branch exhaust conduit 70, the conduit 74 from the distributor D-2 to the cylinder C-1, the conduits 58 from the directional valves V-1, V-2 and V-3 to the distributors D-1, D-2 and D-3, respectively, and the conduits 76 and 77 between the distributor D-3 and the cylinder C-3, the conduits 49, 58 and 74 and the said pairs of conduits functioning alternately as fluid pressure supply and fluid exhaust conduits, and the branch exhaust conduits 65, 70 and 75, all previously described. In addition conduits 66, 73 and 78 extend from the directional valves V-1, V-2, and V-3 to the branch exhaust conduits 65, 70 and 75, respectively. The conduits 66, 73, and 78 are preferably, as shown, of smaller diameter than the branch conduits 65, 70, and 75, since the former carry only the exhaust fluid from the distributors D-1, D-2, and D-3, whereas the latter carry both the exhaust fluid from the distributors and the cylinders C-1, C-2, and C-3. In addition an exhaust conduit 67 extends from the branch exhaust conduit 65 to the cylinder C-1, where it is received in the radial bore 30 in the head H-1. Likewise, an exhaust conduit 72 extends from the branch exhaust conduit 70 to the cylinder C-2, where it is received in the radial bore 35 in the head H-2. The three branch exhaust conduits 65, 70, and 75 are connected to a header 80 which terminates at the reservoir 12, the latter being at atmospheric pressure. An exhaust conduit 84 is connected at one end into the radial bore 43 in the cylinder head H-3 of the cylinder C-3 and at the other end to the header 80.

The fluid pressure input conduits for the directional valves V-1, V-2, and V-3 are comprised of conduits 81, 82, and 83. The conduit 81 extends from the cylinder C-3, where it is received at one end in the right half of the diametrical bore 39 in the cylinder head H-3 to the directional valve V-1. Likewise, the conduit 82 extends from the cylinder C-1, where it is received at one end in the left half of the diametrical bore 27 in the cylinder head H-1 to the directional valve V-3, a branch conduit 83 connecting with the directional valve V-2.

Figure 10:
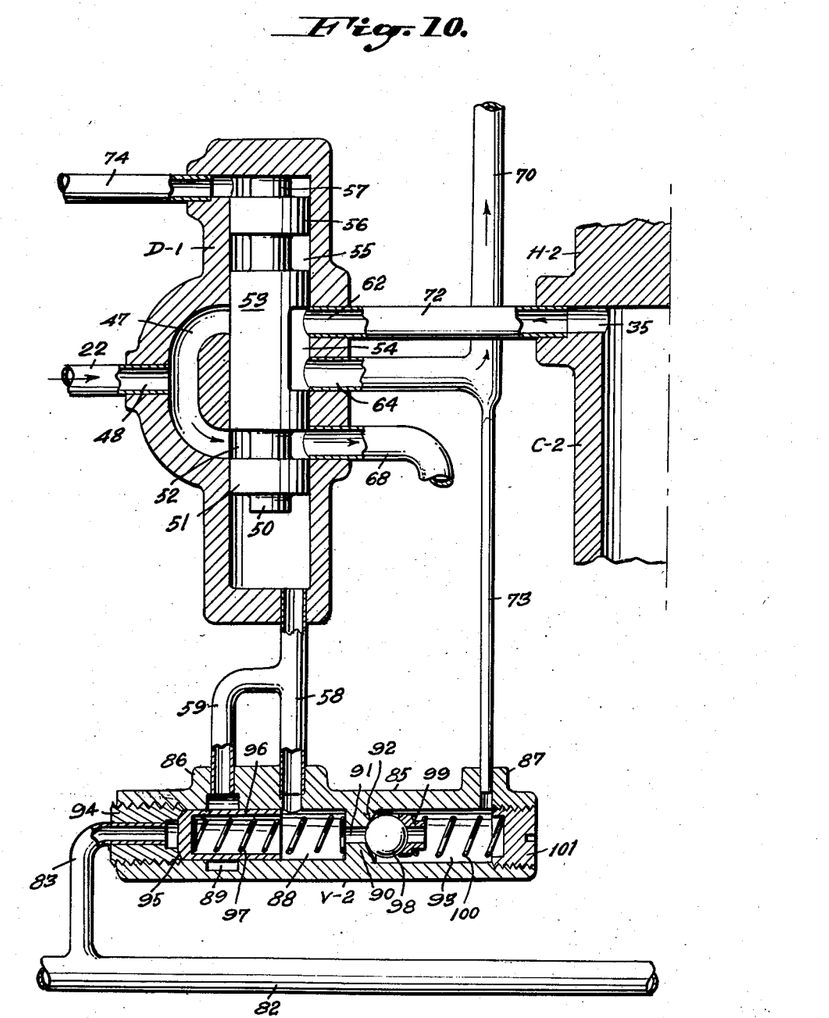

The three (3) directional valves V-1, V-2, and V-3 are identical and only the valve V-2, shown in detail in Fig. 10, will be described. The valve is housed in a main body 85 which is preferably of cylindrical shape and has a forward boss 86 and a rear boss 87. The conduit 58 from the cylinder of the respective distributor enters the body 85 through a suitable rear radial bore in the forward boss 86. Likewise, branch conduit 59 also enters the body through a suitable front radial bore in the forward boss 86. Similarly, the exhaust conduit 73 enters the body 85 through a suitable boss in the rear bore 87. The body 85 has a front axial bore, forming a chamber 88 and a rear axial bore, forming a chamber 93, the two chambers being partially separated by a central wall 90 having an axial hole 91 therethrough. An annular enlargement 89 of the forward bore is formed in the plane of the branch conduit 59. The forward axial bore is closed by a threaded bushing 94, through which the branch conduit 83 enters, and which has a valve seat 95 at its inner end. Reciprocally mounted within the chamber 88 there is a piston valve 96 which is biased toward the seat 95 on the bushing 94 by a compression spring 97 positioned intermediate the piston valve and the wall 90. The wall 90 has a valve seat 92 on its rear face, on which a ball valve 98 is normally seated. A screw threaded plug 101 closes the rear end of the right axial bore. Intermediate the ball valve 98 and the screw plug 101 there is mounted a compression spring 100 which engages the ball valve through a collar washer 99 and normally holds same on the seat 92.

It will be be readily seen that fluid under pressure passing through the conduit 82 will also pass through the branch conduit 83. The fluid entering the left axial bore in the body 85 will force the piston valve 96 rearwardly, against the force of the spring 97, and pass through the annular enlarged chamber 89 into the branch conduit 59, main conduit 58 and cylinder of the distributor D-1, thereby forcing the control piston 53 therein upwardly. On the downward stroke of the control piston 53 the fluid will be forced from the lower end of the cylinder through the main conduit 58 and into the chamber 88. The pressure of the fluid will force the piston valve 96 forwardly onto the valve seat 95 and the fluid will pass through the hole 91 in the central wall 90, unseating the ball valve 98, and flowing into the rear chamber 93. From this latter chamber the fluid passes out through the exhaust conduit 73 and into the main branch exhaust conduit 70.

Figure 4:
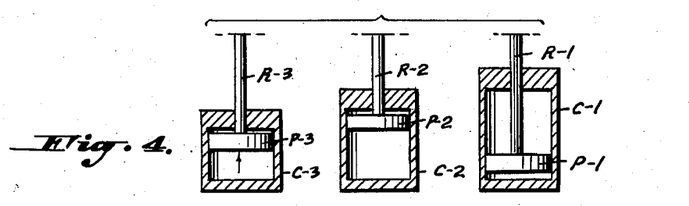
Figures 4 to 9, inclusive, show the three (3) pistons at various relative displacements during a complete cycle of operations; and, Figure 10 is a sectional view showing one of the fluid pressure distributors and a connected directional valve, both in section.
Figure 5:
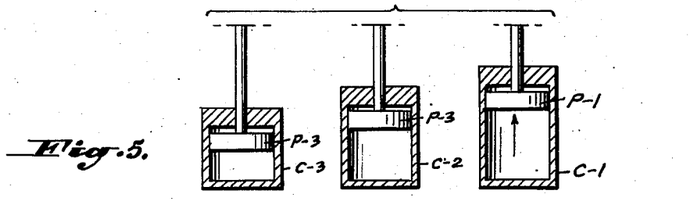
Figure 6:
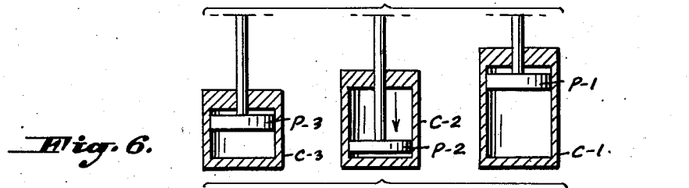
Figure 7:
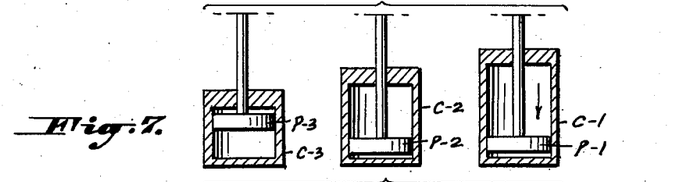
Figure 8:
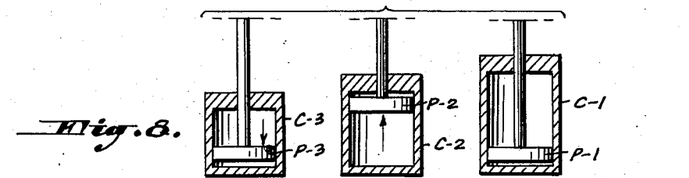
Figure 9:
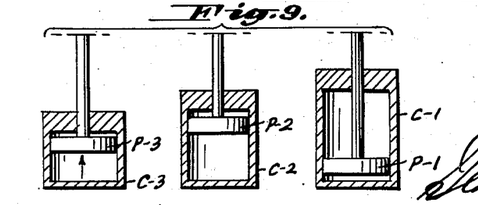

In operation, referring to Figure 2 and Figures 4 to 9, inclusive, let it be assumed that the piston P-3 has just arrived at the end of its upward stroke, this being the position particularly shown in Fig. 4. Fluid under pressure is admitted from the branch fluid pressure conduit 22, the radial bore 40 in the cylinder head H-3, the right angle bore 41 in the piston rod R-3, the left half of the diametrical bore 39 in the cylinder head H-3, and the conduit 81 to the directional valve V-1. From the directional valve V-1 the fluid passes through the branch conduit 59 and the main conduit 58 to the lower end of the cylinder of the distributor D-1. The control piston 53 is thereby moved upwardly to the position shown in Fig. 2. As the control piston is moved upwardly the fluid in the cylinder above same is forced out of the cylinder through the conduit 47, and into the cylinder C-2 through the radial bore 34 and lengthwise extending passage 37 in the cylinder head H-2, diametrical bore 36 in the piston rod R-2, and the exhaust conduit 72 to the branch exhaust conduit 70.

With the control piston 53 of distributor D-1 in the upward position, fluid from the branch pressure supply conduit 19 is admitted to the bore 48 and lower half of the U-shaped passage 47 in the fluid admission chest 46 of the distributor D-1, across the passage 52 in the control piston 53, and through the conduit 61 to the lower end of the cylinder C-1. The piston P-1 is now moved upwardly in the cylinder C-1. As the piston P-1 is moved upwardly the fluid above same in the upper end of the cylinder is forced out through the exhaust conduit 63, the lengthwise extending passage 54 in the control piston 53, and the branch exhaust conduit 65. The pistons P-1, P-2, and P-3 are now in the relative positions shown in Fig. 5.

With the piston P-1 at the end of its upward stroke, fluid under pressure is admitted from the right end of the header 18 into the radial bore 28 in the cylinder head H-1, and passes through the right angle bore 30 on the piston rod P-1 to the right half of its diametrical bore 27 in the cylinder head H-1 and into the conduit 74, through which it flows to the upper end of the distributor valve D-2. The control piston 53 of this distributor is now moved downwardly. As the control piston 53 moves downwardly in the cylinder, the fluid in the lower part of the cylinder below same is forced out through the conduit 58 and into the directional valve V-2, and through exhaust conduit 73 and branch exhaust conduit 70.

When the control piston 53 of the distributor D-2 has arrived at the end of its downward stroke, fluid under pressure will be delivered from the branch conduit 21 to the upper end of the cylinder C-2 through the port 48, upper half of the U-shaped passage 47 in the fluid admission chest 46 of the distributor D-2, across the passage 55 in the control piston 53, and through the port 62 and conduit 69. The piston P-2 will then move downwardly. At the end of this downward movement of the piston, the pistons P-1, P-2 and P-3 will be in the relative positions shown in Fig. 6.

As the piston P-2 moves downwardly the fluid below same in the lower part of the cylinder C-2 is forced out through the conduit 68, the lengthwise extending passage 54 in the control piston 53, and the branch exhaust conduit 70.

When the piston P-2 arrives at the end of its downward stroke, fluid under pressure is admitted from the branch fluid pressure supply conduit 20 to the radial bore 24 in the cylinder head H-2, the right angle bore 33 in the piston rod R-2 and the radial bore 34 in the cylinder head H-2 into the conduit 49 through which it flows to the upper end of the cylinder of the distributor D-1. The control piston 53 of this distributor is now moved downwardly. As the control piston 53 moves downwardly in the cylinder, the fluid in the lower part of the cylinder below same is forced out through the conduit 58 and directional valve V-1, exhaust conduit 66 and branch exhaust conduit 70.

When the control piston 53 of the distributor D-1 is in it downward position, the fluid under pressure will be delivered from the branch conduit 19 to the upper end of the cylinder C-1 through the port 48, upper half of the U-shaped passage 47 in the fluid admission chest 46 of the distributor D-1, across the passage 55 in the control piston 53 and through the conduit 63. The piston P-1 will then move to its downward position. The pistons P-1, P-2 and P-3 are now in the positions shown in Fig. 7.

When the piston P-1 has arrived at the end of its downward stroke the distributors D-2 and D-3 are both actuated as soon as piston P-1 arrives at the end of its downward stroke. This is accomplished in the following manner: Fluid under pressure is admitted from the right end of the header 18 to the radial bore 28 in the cylinder head H-1, the right angle bore 29 in the piston rod P-1 and the left half of the diametrical bore 27 in the cylinder head H-1, and into the conduit 82 from which it passes to the directional valve V-3 and also through the branch conduit 83 to the directional valve V-2. From the directional valve V-2 the fluid passes through the branch conduit 59 and main conduit 58 to the lower end of the cylinder of the distributor D-2. The control piston 53 is thereby moved upwardly to the position shown in Fig. 2. As the control piston is moved upwardly, the fluid in the cylinder above same is forced out of the cylinder through the conduit 74 into the right half of the diametrical bore 27 in the cylinder head H-1 of the cylinder C-1, lengthwise extending passage 32 in the cylinder head H-1, diametrical bore 31 in the piston rod R-1, radial bore 23 in the cylinder head H-1, and exhaust conduit 67 to the branch exhaust conduit 65.

When the control piston 53 of the distributor D-2 arrives at the end of its upward stroke, fluid under pressure will pass from the branch fluid pressure conduit 22 through the port 48 and lower half of the U-shaped passage 47 in the fluid admission chest 46 of the distributor D-2, across the passage 52 in the control piston 53, and through the conduit 68 to the lower end of the cylinder C-2. The piston P-2 is now moved upwardly in the cylinder C-2. As the piston P-2 is moved upwardly the fluid above same in the upper part of the cylinder C-2 is forced out through the conduit 69, the lengthwise extending passage 54 in the control piston 53, and the branch exhaust conduit 70.

Simultaneously, with the above described movements of the control piston 53 of the distributor D-2 and the piston P-2 in the cylinder C-2, fluid under pressure is admitted to the pressure release valve V-3 through the conduit 82. From the pressure release valve V-3 the fluid passes through the branch conduit 59 and main conduit 58 to the upper end of the cylinder of the distributor D-3. The control piston 53 of this distributor is thereby moved downwardly. As the control piston is moved downwardly the fluid below same in the cylinder of the distributor D-3 is forced out through the conduit 79 and into the left half of the diametrical bore 39 in the cylinder head H-3 of the cylinder C-3, through the lengthwise extending passage 45 in this cylinder head, the diametrical bore 44 in the piston rod R-3, the radial bore 43 in the cylinder head and into the exhaust conduit 84.

When the control piston 53 of the distributor D-3 has arrived at the end of its downward stroke, fluid under pressure will pass from the left end of the header 18 through the port 48 and upper half of the U-shaped passage 47 in the fluid admission chest 46 of the distributor D-3, across the passage 55 in the control piston 53, and through the conduit 77 to the upper end of the cylinder C-3. The piston P-3 is now moved downwardly in the cylinder C-3. As the piston P-3 is moved downwardly the fluid below same in the lower part of the cylinder C-3 is forced out through the conduit 76, the lengthwise extending passage 54 in the control piston 53 and the branch exhaust conduit 75. The pistons P-1, P-2, and P-3 are now in the relative positions shown in Fig. 8.

When the piston P-3 arrives at the end of its downward stroke, it will return automatically. This is brought about in the following manner: When at the lower end of its stroke fluid under pressure will pass from the branch fluid pressure conduit 23, through the radial bore 40 in the cylinder head H-3 of the cylinder C-3, the right angle bore 42 in the piston rod R-3, the conduit 79 and into the lower end of the distributor cylinder C-3. The control piston 53 of the distributor is now moved upwardly in the cylinder D-3. As the control piston is moved upwardly the fluid above same in the upper part of the cylinder C-3 is forced out through the conduit 58, directional valve V-3, and exhaust conduit 78 to the branch exhaust conduit 75.

When the control piston 53 of the distributor D-3 has arrived at the end of its upward stroke, fluid under pressure will pass from the left end of the header 18 through the port 48 and the lower half of the U-shaped passage 47 in the fluid admission chest 46 of the distributor D-3 across the passage 53 in the control valve 55, and through the conduit 76 to the lower end of the cylinder C-3. The piston P-3 is now moved upwardly in the cylinder C-3. As the piston P-3 is moved upwardly the fluid above same in the upper part of the cylinder C-3 is forced out through the conduit 77, the lengthwise extending passage 54 in the control piston 53 and the branch exhaust conduit 75. The pistons P-1, P-2, and P-3 are now in the relative positions shown in Fig. 9, and the cycle of operation is complete.

It will be apparent that the above described and illustrated embodiment of the invention constitutes the preferred embodiment of same and that numerous changes may be made in the same without departing from the spirit of the invention as defined by the appended claims.

What is claimed is:

1. In a hydraulic control system, a main fluid pressure conduit, a plurality of cylinders, a piston reciprocable in each cylinder, a distributing valve for each cylinder controlling fluid flow to and therefrom, a directional valve associated with each control distributing valve for controlling the admission to and exhaust therefrom of fluid, a branch conduit from the fluid pressure line through each control distributing valve to each cylinder, valve means controlled by the piston in each cylinder and operable when said piston is at either end of its stroke, and fluid pressure conduits between the valve means of the first cylinder and the directional valves associated with the control distributing valves for the second and third cylinders, and additional fluid pressure conduits between the control distributing valve means of the second cylinder and the directional valve associated with the control distributing valve for the first cylinder whereby the piston in the first cylinder operates the second and the second piston restores the first.

2. In a hydraulic control system, a main fluid pressure conduit, a plurality of cylinders, a piston reciprocable in each cylinder, a distributing valve for each cylinder controlling fluid flow to and therefrom, a directional valve associated with each control distributing valve for controlling the admission to and exhaust therefrom of fluid, a branch conduit from the fluid pressure line through each control distributing valve to each cylinder, valve means controlled by the piston in the first cylinder and operated when the said piston is at either end of its stroke, and fluid pressure conduits between the valve means of the first cylinder and the directional valves associated with the control distributing valves for the second and third cylinders, and additional fluid pressure conduits between the control distributing valve means of the first cylinder and the directional valve associated with the control distributing valve for the third cylinder, whereby the piston in the first cylinder operates the control distributing valve for the second cylinder, the piston in the second cylinder operates the control distributing valve for the first cylinder and the piston in the first cylinder also operates the control distributing valve for the third cylinder.

3. In a hydraulic control system, a main fluid pressure conduit, a plurality of cylinders, a piston reciprocable in each cylinder, a control distributing valve for each cylinder controlling fluid flow to and therefrom, a branch conduit from the main fluid pressure conduit through each control distributing valve to each cylinder, valve means comprised in part by passages at one end of a first cylinder and passages in the rod of the piston of said cylinder adapted to register with the first passages at either end of the stroke of said piston, a branch conduit from the main fluid pressure conduit open through the said valve means at the end of the working stroke of the piston in the first cylinder to the control distributing valve of a second cylinder for supplying fluid pressure to and operating the piston in said second cylinder.

4. In a hydraulic control system, a main fluid pressure conduit, a plurality of cylinders, a piston reciprocable in each cylinder, a control distributing valve for each cylinder controlling fluid flow to and therefrom, a branch conduit from the main fluid pressure conduit through each control distributing valve to each cylinder, valve means comprised in part by passages at one end of a master cylinder and passages in the rod of the piston adapted to register with the first of said passages at either end of the stroke of said piston, a branch conduit from the main fluid pressure conduit open through the said valve means at the end of the working stroke of the piston in the master cylinder to the control distributing valve for a slave cylinder for operating said control distributing valve to supply fluid pressure to the slave cylinder, valve means composed in part of passages at one end of the slave cylinders and passages in the rod of the piston of said cylinder adapted to register with the first of said passages in the said slave cylinder, and a fluid pressure conduit from the latter valve means to the control distributing valve for the master cylinder for conducting pressure to operate said control distributing valve at the end of the working stroke of the slave piston to admit fluid under pressure to the master cylinder to cause the piston therein to carry out its return stroke.

5. In a hydraulic control system, a main fluid pressure conduit, a master cylinder and two slave cylinders, a piston reciprocable in each cylinder, a control distributing valve for each cylinder controlling fluid flow to and therefrom, a branch conduit from the main fluid pressure conduit through each control distributing valve to each cylinder, valve means for each cylinder and piston composed in part of passages at one end of the cylinder and passages in the rod of the piston therein adapted to register with the first passages at either end of the stroke, branch fluid supply conduits from the main fluid pressure conduit to each of said valve means, a fluid supply conduit from the valve means in the master cylinder opened by said valve means, valve means at the end of the working stroke of the master piston and communicating with the control distributing valve of a first slave cylinder for admitting fluid pressure to said first slave cylinder to operate the piston in the latter, a fluid supply conduit from the valve means of the first slave cylinder and opened by the latter valve means at the end of the working stroke of the slave piston and communicating with the control distributing valve of the master cylinder for admitting fluid pressure to said master cylinder to cause the piston therein to carry out its return stroke, a second fluid supply conduit from the valve means of the master cylinder and opened by the master piston at the end of its return stroke and communicating with the control distributing valve of the second slave cylinder to said master cylinder for operating said control distributing valve for admitting fluid to the master cylinder to restore its piston to the initial upper position.

6. In a hydraulic control system, a source of fluid under pressure, a fluid supply conduit connected with said source, a fluid exhaust conduit, a plurality of hydraulic cylinders and pistons, each piston having a rod, fluid distributing means for each cylinder controlling the operation of the related piston by the pressure fluid, an actuating piston for each distributing means, a control cylinder movably receiving each actuating piston, passages in each hydraulic cylinder communicating with the supply and the exhaust conduits, conduits connecting said passages with the opposite ends of the control cylinders, and ports in the piston rods operative in different positions of the hydraulic pistons to variably control communication between the passages and the connecting conduits, the connecting conduits connected with the passages in one of the hydraulic cylinders being connected with the control cylinder associated with another of the hydraulic cylinders whereby the several distributing means are actuated to cause sequential operation of the hydraulic pistons.

7. A control system as claimed in claim 6, wherein throttling means is provided between each hydraulic cylinder and the related distributing means.

8. A hydraulic control system as claimed in claim 6, wherein the ports in each piston rod are arranged adjacent the opposite ends of the latter and the passages arranged at one end of the cylinder.

9. A hydraulic control system as claimed in claim 6, wherein the ports in each piston are arranged adjacent the opposite ends of the piston and are of angular form, the passages being arranged in contiguous relation at one end of the cylinder.

10. In a hydraulic system, a source of fluid under pressure, a fluid supply conduit connected with said source, a fluid exhaust conduit, a plurality of hydraulic cylinders and pistons, each piston having a rod, fluid distributing means for each of said hydraulic cylinders controlling the operation of the related piston by the pressure fluid, an actuating piston for each control distributing means, a control cylinder movably receiving each said actuating pistons, passages in each hydraulic cylinder communicating with the supply and exhaust conduits, conduits connecting said passages with the opposite ends of the control cylinders, and ports in the piston rods for variably controlling communication between said passages and the connecting conduits, the connecting conduits connected with the passages in one of the hydraulic cylinders being also connected with the control distributing means for another of the hydraulic cylinders, whereby the said control distributing means are actuated by fluid under pressure to cause sequential operation of the hydraulic pistons.

11. In a hydraulic system, a source of fluid under pressure, a fluid supply conduit connected with said source, a fluid exhaust conduit, a plurality of hydraulic cylinders and pistons, each piston having a rod, fluid distributing means for each of said hydraulic cylinders controlling the operation of the related piston by the pressure fluid, an actuating piston for each control distributing means, a control cylinder movably receiving each said actuating pistons, passages in each hydraulic cylinder communicating with the supply and exhaust conduits, conduits connecting said passages with the opposite ends of the control cylinders, and ports in the piston rods for variably controlling communication between said passages and the connecting conduits, the connecting conduits connected with the passages in one of the hydraulic cylinders being also connected with several control distributing means associated with several of the other hydraulic cylinders, whereby the said control distributing means are actuated by fluid under pressure to cause sequential operation of the hydraulic pistons.

12. In a hydraulic system, a source of fluid under pressure, a fluid supply conduit connected with said source, a fluid exhaust conduit, a plurality of hydraulic cylinders and pistons, each piston having a rod, fluid distributing means for each of said hydraulic cylinders controlling the operation of the related piston by the pressure fluid, an actuating piston for each control distributing means, a control cylinder movably receiving each said actuating pistons, passages in each hydraulic cylinder communicating with the supply and exhaust conduits, conduits connecting said passages with the opposite ends of the control cylinders, and ports in the piston rods for variably controlling communication between said passages and the connecting conduits, the connecting conduits connected with the passages in one of the hydraulic cylinders being also connected with one or several of the control distributing means associated with one or several of the other hydraulic cylinders and also with the control distributing means associated with the said one of the hydraulic cylinders, whereby the said control distributing means are actuated by fluid under pressure to cause sequential operation of the hydraulic pistons.

13. In a hydraulic system, a source of fluid under pressure, a fluid supply conduit connected with said source, a fluid exhaust conduit, a plurality of hydraulic cylinders and pistons, each piston having a rod thereon, fluid distributing means for each of said hydraulic cylinders, said fluid distributing means controlling the operation of the related piston by the pressure fluid, a first set of passages in each hydraulic cylinder communcating respectively with the fluid supply and exhaust conduits, conduits connecting said first set of passages with the fluid control distributing means, a second set of passages in each hydraulic cylinder communicating with the supply and exhaust conduits, directional valves for delivering fluid under pressure from the fluid supply conduit to the control distributing means and evacuating said fluid from the control distributing means to the exhaust conduit, certain of the second set of passages communicating with said directional valves for delivering fluid under pressure to the fluid control distributing means, others of said second set of passages communicating with the exhaust conduit, ports in said piston rods for variably controlling communication between said set of passages and the connecting conduits, the connecting conduits communicating with said second set of passages in one of the hydraulic cylinders being also connected with the control distributing means associated with another of the hydraulic cylinders, whereby the said control distributing means are actuated by fluid under pressure to cause sequential operation of the hydraulic pistons.

14. In a hydraulic system, a source of fluid under pressure, a fluid supply conduit connected with said source, a fluid exhaust conduit, a plurality of hydraulic cylinders and pistons, each piston having a rod thereon, fluid distributing means for each of said hydraulic cylinders, said fluid distributing means controlling the operation of the related piston by the pressure fluid, a first set of passages in each hydraulic cylinder communicating respectively with the fluid supply and exhaust conduits, conduits connecting said first set of passages with the fluid control distributing means, a second set of passages in each hydraulic cylinder communicating with the supply and exhaust conduits, directional valves for delivering fluid under pressure from the fluid supply conduit to the control distributing means and evacuating said fluid from the control distributing means to the exhaust conduit, certain of the second set of passages communicating with said directional valves for delivering fluid under pressure to the fluid control distributing means, others of said second set of passages communicating with the exhaust conduit, ports in said piston rods for variably controlling communication between said set of passages and the connecting conduits, the connecting conduits communicating with said second set of passages in one of the hydraulic cylinders being also connected with several control distributing means associated with several of the other hydraulic cylinders, whereby the said control distributing means are actuated by fluid under pressure to cause sequential operation of the hydraulic pistons.

15. In a hydraulic system, a source of fluid under pressure, a fluid supply conduit connected with said source, a fluid exhaust conduit, a plurality of hydraulic cylinders and pistons, each piston having a rod thereon, fluid distributing means controlling the operation of the related piston by the pressure fluid, a first set of passages in each hydraulic cylinder communicating respectively with the fluid supply and exhaust conduits, conduits connecting said first set of passages with the fluid control distributing means, a second set of passages in each hydraulic cylinder communicating with the supply and exhaust conduits, directional valves for delivering fluid under pressure from the fluid supply conduit to the control distributing means and evacuating said fluid from the control distributing means to the exhaust conduit, certain of the second set of passages communicating with said directional valves for delivering fluid under pressure to the fluid control distributing means, others of said second set of passages communicating with the exhaust conduit, ports in said piston rods for variably controlling communication between said set of passages and the connecting conduits, the connecting conduits communicating with said second set of passages in one of the hydraulic cylinders being also connected only with the control distributing means associated with said one of the hydraulic cylinders, whereby the said control distributing means are actuated by fluid under pressure to cause sequential operation of the hydraulic pistons.

16. In a hydraulic system, a source of fluid under pressure, a fluid supply conduit connected with said source, a fluid exhaust conduit, a plurality of hydraulic cylinders and pistons, each piston having a rod thereon, fluid distributing means for each of said hydraulic cylinders, said fluid distributing means controlling the operation of the related piston by the pressure fluid, a first set of passages in each hydraulic cylinder communicating respectively with the fluid supply and exhaust conduits, conduits connecting said first set of passages with the fluid control distributing means, a second set of passages in each hydraulic cylinder communicating with the supply and exhaust conduits, directional valves for delivering fluid under pressure from the fluid supply conduit to the control distributing means and evacuating said fluid from the control distributing means to the exhaust conduit, certain of the second set of passages communicating with said directional valves for delivering fluid under pressure to the fluid control distributing means, others of said second set of passages communicating with the exhaust conduit, ports in said piston rods for variably controlling communication between said set of passages and the connecting conduits, the connecting conduits communicating with said second set of passages in one of the hydraulic cylinders being also connected with one or several of the control distributing means associated with one or several of the other hydraulic cylinders and also with the control distributing means associated with said one of the hydraulic cylinders, whereby the said control distributing means are actuated by fluid under pressure to cause sequential operation of the hydraulic pistons.

RENÉ DÉTREZ.

References Cited in the file of this patent

UNITED STATES PATENTS

| Number | Name | Date |
|---|---|---|
| 1,817,552 | Galloway | Aug. 4, 1931 |
| 2,054,296 | Merrill | Sept. 15, 1936 |
| 2,184,057 | Parker | Dec. 19, 1939 |
| 2,209,608 | Nye et al. | July 30, 1940 |
| 2,307,544 | Robinson | Jan. 5, 1943 |
| 2,371,893 | Hyland | Mar. 20, 1945 |
| 2,397,106 | Haller | Mar. 26, 1946 |

FOREIGN PATENTS

| Number | Country | Date |
|---|---|---|
| 3,988 | Great Britain | Mar. 16, 1887 | means for each of said hydraulic cylinders, said